(12) United States Patent
Ackermann-Markes

(10) Patent No.: US 8,374,329 B2
(45) Date of Patent: Feb. 12, 2013

(54) DEVICE AND METHOD FOR ENERGY-SAVING OPERATION OF A COMMUNICATION TERMINAL

(75) Inventor: Achim Ackermann-Markes, Wörthsee (DE)

(73) Assignee: Siemens Enterprise Communications GmbH Co. KG, Munich (DE)

( * ) Notice: Subject to any disclaimer, the term of this patent is extended or adjusted under 35 U.S.C. 154(b) by 688 days.

(21) Appl. No.: 11/992,436

(22) PCT Filed: Aug. 24, 2006

(86) PCT No.: PCT/EP2006/065625
§ 371 (c)(1),
(2), (4) Date: Jul. 1, 2009

(87) PCT Pub. No.: WO2007/033880
PCT Pub. Date: Mar. 29, 2007

(65) Prior Publication Data
US 2009/0274288 A1 Nov. 5, 2009

(30) Foreign Application Priority Data
Sep. 21, 2005 (DE) .......................... 10 2005 045 115

(51) Int. Cl.
*H04M 3/42* (2006.01)

(52) U.S. Cl. .............................. 379/211.01; 379/395.01

(58) Field of Classification Search .................. 379/211, 379/211.01, 211.02, 395.01; 455/575
See application file for complete search history.

(56) References Cited

U.S. PATENT DOCUMENTS

| 5,008,900 A | 4/1991 | Critchlow et al. |
| 6,091,948 A | 7/2000 | Carr et al. |
| 2002/0173297 A1* | 11/2002 | Phillips ........................ 455/417 |
| 2003/0149903 A1 | 8/2003 | Chang |
| 2003/0181202 A1 | 9/2003 | Link, II et al. |
| 2003/0210658 A1 | 11/2003 | Hernandez et al. |
| 2003/0231749 A1* | 12/2003 | Ansley et al. .............. 379/93.17 |
| 2007/0067445 A1* | 3/2007 | Vugenfirer et al. .......... 709/224 |

FOREIGN PATENT DOCUMENTS

| DE | 19927585 A1 | 12/2000 |
| DE | 10063098 A1 | 4/2002 |
| GB | 2396779 | 12/2002 |
| JP | 03-085894 | 4/1991 |
| JP | 05-103360 | 4/1993 |
| JP | 07-250360 | 9/1995 |
| JP | 9098213 | 4/1997 |
| JP | 2001333208 A | 11/2001 |
| JP | 2005-151332 | 6/2005 |
| WO | WO 0115416 A1 | 3/2001 |

OTHER PUBLICATIONS

International Preliminary Report on Patentability for PCT/EP2006/065625 dated Jul. 8, 2008 (Form PCT/IPEA/409).

* cited by examiner

*Primary Examiner* — Curtis Kuntz
*Assistant Examiner* — Amal Zenati
(74) *Attorney, Agent, or Firm* — Buchanan Ingersoll & Rooney PC

(57) ABSTRACT

During establishing a communication or power characteristics, an idle state is activated such that a communication terminal is at least temporarily unattainable. The idle state results in reducing electric power consumption in the communication terminal for which switchings off such as Always-on-Device are not provided.

11 Claims, No Drawings

DEVICE AND METHOD FOR ENERGY-SAVING OPERATION OF A COMMUNICATION TERMINAL

CROSS REFERENCE TO RELATED APPLICATIONS

This application is the US National Stage of International Application No. PCT/EP2006/065625, filed Aug. 24, 2006 and claims the benefit thereof. The International Application claims the benefits of German application No. 10 2005 045 115.2 DE filed Sep. 21, 2005, both of the applications are incorporated by reference herein in their entirety.

FIELD OF INVENTION

The invention relates to a method for the energy-saving operation of a communication terminal, and to a correspondingly designed communication terminal, in particular a desk telephone.

BACKGROUND OF INVENTION

Wireless communication terminals that can be switched off for energy-saving purposes are known in the prior art. An example of such wireless communication terminals is the cellular telephone. For this wireless communication terminal, any energy-saving particularly means increased running time of a battery integrated in the device.

Furthermore, communication terminals that are not provided with such a deactivation facility are also known in the prior art. There are various reasons why such communication terminals cannot or do not need to be switched off:
- the power consumption of conventional analog desk telephones is low anyway;
- some desk telephones are powered via an electrical cable and therefore do not have a battery, the running time of which would need to be extended by switching off,
- a facility for switching off wire-bound communication terminals and/or desk telephones for company use is against the law in some countries, particularly in the USA in which emergency scenarios are governed by law (E911 regulations). The aforementioned communication terminals, which do not have a switch-off function and/or which must be continuously kept on standby, are often also referred to as "always-on devices".

SUMMARY OF INVENTION

The object of the invention is to reduce the consumption of electrical power by terminals that cannot be switched off, whilst at the same time retaining their character as "always-on devices".

This object is achieved by a method, communication terminal, and desk telephone, having the features described in the independent claims.

The invention is based on the notion of providing an idle state or standby mode, which is entered into when call-processing statuses or performance features are initiated, wherein the communication terminal is temporarily or permanently inaccessible.

Advantageous further developments of the invention are specified in the subclaims.

In one advantageous further development, provision is made for the device to quit the idle state or standby mode in the following situations:
- when the receiver is lifted
- when any key on the communication terminal is pressed
- when activated by the communication device. Such activation by the communication device may, for example, be effected by means of a special message. If the message is transferred via a packet-oriented network to which the communication terminal—for example a VoIP communication terminal—is connected, this is also known as WOL ("WakeUp On LAN" or "WakeUp On Local Area Network").

Another advantageous further development of the invention provides for the anticipated waiting period to be displayed on an output unit of the terminal during the transition from idle state to active mode. This may, for example, be effected by means of a "Please wait" text message.

The terminal switches to active mode, for example, when the handset is lifted.

Another further development provides for an audible signal that corresponds acoustically to a "ring-back signal" to be emitted when the handset is lifted. This audible signal does not perform the same function as a ring-back signal, but gives the user the sense that the communication terminal, which is currently still in the idle state and is only just switching to active mode, is already functional.

A particularly advantageous embodiment of the invention relates to an additional allocation to idle state when features are activated which result in an incoming call for the user not being switched directly to said user's communication terminal.

An exemplary embodiment with further details and embodiment of the invention are described in greater detail below.

The terms idle state or standby mode are used below to mean current technical processes that result in reduced electrical consumption of electrical power by a communication terminal. Examples of this include dimming or complete deactivation of output units such as—for example—a display, the momentary storage of data loaded in the main memory into a non-volatile memory, combined with the winding down or deactivation of a device-internal processor, as well as other methods of initiating an idle state that are known from the data processing field.

One exemplary embodiment that applies the inventive features relates to a so-called voice mail function. A communication terminal is switched to the idle state when calls are routed to a voice mail service or call-answering device.

A further case relates to call diversion. Call diversion means that a user specifies an alternative destination directory number to which incoming calls are put through. This is another performance feature that results in an incoming call not being put through directly to the communication terminal provided for the user. In this case, too, an idle state may be advantageously provided which results in a significant reduction in electrical power consumption.

A further example of such a performance feature is the "call protect" function. Call protect means that a user may still telephone a called second user, but does not actually receive any incoming calls.

The aforementioned performance features or functions, as well as other, unspecified functions which result an incoming call not being put through directly to the user's communication terminal, are used as triggers for initiating an idle state when they are activated. The idle state is initiated on the communication terminal and triggered by the communication terminal itself or, alternatively, by a communication device controlling the communication terminal.

To preserve the communication terminal's character as an "always-on device", i.e. to guarantee its ready state, the idle state is terminated immediately as soon as one of the following situations occurs:

when the handset is lifted when any key on the communication terminal is pressed when activated by the communication device. Such activation by the communication device may, for example, be effected by means of a special message. If the message is transferred via a packet-oriented network to which the communication terminal—for example a VoIP communication terminal—is connected, this is also known as WOL ("WakeUp On LAN" or "WakeUp On Local Area Network").

Other exemplary embodiments of the inventive method are explained below.

A function key is permanently assigned to the "activate standby" function. Ideally, a so-called failure destination is configured in the communication device. This configuration of a failure destination or "CFSS destination" results in an incoming call to a communication terminal being diverted to the failure destination if that terminal is disconnected or unavailable. One failure destination, for example, is the voice mail service provided in the communication device. When the handset is lifted or any function key is pressed, the communication terminal switches from its current idle state into active mode. In the case of a so-called VoIP (Voice over IP) communication terminal, active mode or idle state is also initiated by means of an appropriate message transferred via the packet-oriented network.

Where function keys are permanently assigned with performance features, such as—for example—voice mail, call diversion or caller protection, a link for initiating the aforementioned performance features, with activation of the idle state may be provided in the communication device or in the communication terminal itself.

If the function keys are freely programmable, the programmable "meaning" of a particular function key is often stored in a non-volatile memory in the communication terminal. If the function keys have been configured by the user or even by an administrator, the communication device signals to the communication terminal that activation of the idle state is associated with these function keys. If the key assignment or "meaning" of function keys is stored in non-volatile memory, however, the additional linking of a selected function key to an idle state may also be stored in the volatile memory of the communication terminal. During the transition to active mode the communication terminal reloads the intended function key assignment and thus the linking of the intended function keys to the idle state.

If performance features are not permanently allocated to fixed function keys but are freely programmable, the communication device signals to the communication terminal that activation of the idle state is associated with an activated function key. If the key assignment is stored in non-volatile memory in the communication terminal, this relationship between the function key and the idle state becomes available again following the transition to active mode.

Alternatively or additionally, a switch to the idle state is automatically initiated and returned to a further programmable status at configurable times. One such function may, for example, be used as a night-answering function.

Furthermore, an idle state may be initiated by a message via the packet-oriented network to which the communication terminal is connected. In a similar manner, termination of the idle state is terminated or switched into active mode via a corresponding message.

The inventive method for entering into an idle state may be implemented at the communication terminal itself or even in the communication device controlling the communication terminal. A distributed or combined implementation in the form of a communication terminal controlled by a communication device is also a potential embodiment of the invention.

One use of the inventive method may be considered particularly in the case of VoIP telephones, which are commonly used today. Most communication terminals of this type have large color displays as output units, the electrical power requirement of which will reach 10 watts in the near future.

Uninterrupted operation of such communication terminals, particularly for the large number of communication terminals used in companies, would require considerable electrical power consumption.

In addition to the immediately visible financial impact and the ecological issue of power consumption that could actually be avoided, the problem with such communication terminals is that they usually receive their electrical power via the telephone connection cable, for example a desk telephone.

Likewise in VoIP communication terminals, electrical power is supplied via a network cable connecting the communication terminal to a packet-oriented network. The provision of electrical power via a network cable is often also referred to as "Power over LAN" (abbreviated to PoL). Increasing power consumption in this case sometimes also means increased investment or reinvestment in the infrastructure.

The above-mentioned problems are minimized or resolved by means of the invention.

The invention claimed is:

1. A method for operating a communication terminal, comprising:
    automatically detecting an activation of a performance feature, the performance feature results, at least temporarily, in a call directed at the communication terminal not being put through directly to the communication terminal; and
    automatically transferring to idle state in which the communication terminal is in a reduced power consumption mode without switching off the communication terminal when the performance feature is activated,
    wherein the communication terminal is a wire-bound desk telephone.

2. The method as claimed in claim 1, wherein the performance feature includes call-diversion, call protection or combinations thereof.

3. The method as claimed in claim 1, wherein an operation carried out on the communication terminal results in the terminal switching from the idle state into active mode.

4. The method as claimed in claim 1, wherein a request communicated by a communication device controlling the communication terminal results in the terminal switching from the idle state into active mode.

5. The method as claimed in claim 1, further comprises transferring from the idle state to an active mode for an action selected from the group consisting of:
    lifting a handset of the communication terminal,
    pressing a key on the communication terminal,
    activating via a communication device controlling the communication terminal, and combinations thereof.

6. A communication terminal, comprising:
an active mode; and
a detecting unit that automatically detects the activation of a performance feature and automatically transfers from the active mode to an idle state in which the communication terminal is in a reduced power consumption mode without switching off the communication terminal as a result of the detection,
wherein the performance feature at least temporarily results in a call directed at the communication terminal not being put through directly to the communication terminal, and
wherein the communication terminal is a wire-bound desk telephone.

7. The communication terminal as claimed in claim 6, further includes a packet-oriented connection.

8. The communication terminal as claimed in claim 6, wherein the terminal is transferred from the idle state to an active mode for an action selected from the group consisting of:
lifting a handset of the communication terminal,
pressing a key on the communication terminal,
activating via a communication device controlling the communication terminal, and combinations thereof.

9. A desk telephone, comprising:
a handset;
a plurality of keys; and
an idle state which reduces electrical power consumption by the telephone without switching off the telephone and an active mode using a normal power consumption by the telephone,
wherein a transfer from the idle state to the active mode occurs when the handset is lifted, at least one of the plurality of keys is pressed or a combination thereof,
wherein a transfer into the idle state from the active mode is automatically activated via the activation of a performance feature,
wherein the performance feature at least temporarily results in a call directed at the communication terminal not being put through directly to the communication terminal, and
wherein the telephone is a wire-bound desk telephone.

10. The desk telephone as claimed in claim 9, wherein a transfer from the active mode to the idle state is activated by a communication device.

11. The desk telephone as claimed in claim 9, wherein a transfer from the active mode to the idle state is activated in a time-dependent manner.

* * * * *